United States Patent [19]

Miley

[11] 4,307,400
[45] Dec. 22, 1981

[54] ELECTRONIC COUNTERMEASURES SYSTEM AND METHOD OF UTILIZING THE SAME

[75] Inventor: Frank P. Miley, Camarillo, Calif.

[73] Assignee: The United States of America as represented by the Secretary of the Navy, Washington, D.C.

[21] Appl. No.: 772,071

[22] Filed: Sep. 29, 1968

[51] Int. Cl.$^3$ .................... G01S 13/40; G01S 7/38
[52] U.S. Cl. ..................................... 343/18 E; 343/7.5
[58] Field of Search .................. 343/6.8, 6.8 LC, 7.5, 343/18 E

[56] References Cited

U.S. PATENT DOCUMENTS 2,862,203 11/1958 Skaraeus et al. .................. 343/18 E Primary Examiner—Malcolm F. Hubler
Attorney, Agent, or Firm—Richard S. Sciascia; Joseph M. St. Amand

[57] ABSTRACT

A method and apparatus for "masking" an aircraft or other vehicle so as to prevent it from being located by an enemy radar. The vehicle is provided with means for generating and radiating a CW signal which is gated off during the reception of a radar pulse, such that a narrow gap or slot is produced in the CW signal. The reflected radar pulse in effect "falls into" this slot and hence is indistinguishable from the remainder of the CW signal as seen by the operator of the enemy radar.

4 Claims, 2 Drawing Figures

ELECTRONIC COUNTERMEASURES SYSTEM AND METHOD OF UTILIZING THE SAME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It has become standard practice to employ pulse-type radars to indicate the presence, or determine the location, of hostile aircraft or other targets under wartime conditions. In some instances, ground-based radars are used to warn of the approach of enemy aircraft, while in other applications radar equipment is designed as an integral part of the so-called "homing" missiles so as to permit them to lock on to and track a target despite any evasive action that the latter may take in an attempt to avoid impact.

Naturally, the widespread use of such radar systems has stimulated activity in the field of countermeasures. This activity has been directed largely to the development of means for effectively "jamming" the radar equipment so as to prevent it from determining the location of a target, this "jamming" procedure usually consisting of the transmission of high-amplitude, high-duty-cycle energy having a frequency as close as possible to the operating frequency of the radar. Such an expedient is not always effective, however, since the reflected pulses from the target in effect "ride upon" the jamming signal and can be detected by the radar through the use of conventional clipping and limiting networks. In order to completely mask the target, it is usually necessary to make the return pulses indistinguishable from the jamming signal radiated by the target insofar as the enemy radar is concerned. It is possible in certain cases to disable the enemy radar by producing a jamming signal of such high power as to saturate the second detector of the radar, or to develop such a large negative AGC voltage that the radar gain is reduced to a point where target reflections are of such low amplitude that they cannot be observed. However, this requires a power source of large capacity, and its size and weight can not always be tolerated on an airborne vehicle.

SUMMARY OF THE INVENTION

According to a feature of the present invention, the jamming signal transmitted by a vehicle seeking to avoid having its position determined by radar is interrupted in timed coincidence with the impingement thereon of pulses arriving from the radar. Expressed differently, the waveform of the jamming signal is slotted or notched in such fashion that each reflected radar pulse "falls into" a slot or notch and consequently does not rise above the envelope of the jamming energy. The result is that the radar is unable to "separate out" the reflected pulses from the jamming signal since the amplitude level of the received signal remains constant except for random noise excursions.

STATEMENT OF THE OBJECTS OF INVENTION

One object of the present invention, therefore, is to provide an effective countermeasures method and apparatus designed to prevent an aircraft or other vehicle from being located by an enemy radar.

Another object of the invention is to provide a countermeasures system in which a jamming signal transmitted by a vehicle in an attempt to avoid having its position pin-pointed by an enemy radar is interrupted as a function of the reception by such vehicle of each radar pulse.

A further object of the invention is to provide an electronic countermeasures system in which reception of a radar pulse by a vehicle effectively gates off the transmission by such vehicle of a jamming signal for the time duration of such radar pulse.

Other objects, advantages, and novel features of the invention will become apparent from the following detailed description of the invention when considered in conjunction with the accompanying drawings.

DESCRIPTION OF THE PREFERRED EMBODIMENT

Figure 1:
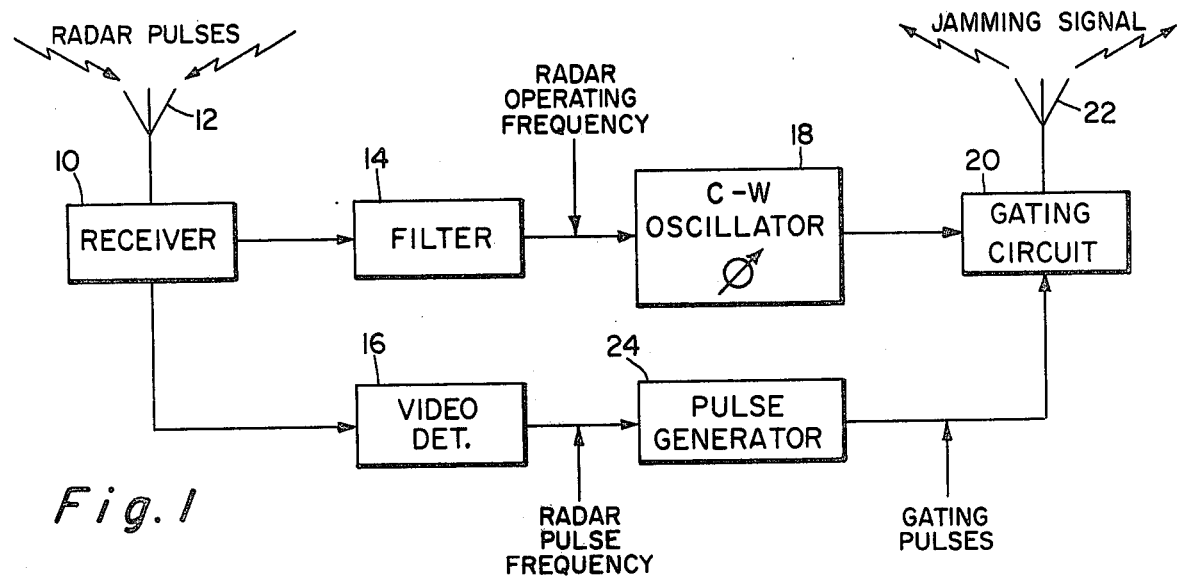
FIG. 1 is a block diagram of an electronic countermeasures system designed in accordance with a preferred embodiment of of the present invention.

Referring now to FIG. 1 of the drawings, there is illustrated an electronic countermeasures system embodying the present concept. This system is intended to be installed upon an aircraft or other vehicle when it is desired to prevent such vehicle from being detected and/or located by an enemy radar.

As illustrated in the drawing, a receiver 10 is provided for receiving and demodulating pulses transmitted by an enemy radar (not shown) and which pulses are picked up by an antenna 12. The output of the receiver 10 is applied to a filter 14 and to a video detector 16, respectively, the former developing a signal indicative of the operating frequency of the radar and the latter producing a signal representative of the repetition frequency of the pulses picked up by antenna 12.

The system of FIG. 1 also includes a CW oscillator 18 the operation of which is controlled in accordance with the signal developed by filter 14. The result is that oscillator 18 generates a continuous-wave jamming signal which is fed through a gate 20 for transmission from a second antenna 22, the operating frequency of oscillator 18 being essentially identical to the operating frequency of the radar it is desired to jam.

The signal from the video detector 16 is applied to control the operation of a pulse generator 24 in such fashion that the latter produces a series of pulses in time coincidence with the radar pulses picked up by antenna 12. These pulses produced by the unit 24 are employed to activate the gating circuit 20 such that the latter is closed to prevent the passage therethrough of the CW signal from oscillator 18 during the time duration of each radar pulse. The result is that the jamming signal transmitted from antenna 22 is interrupted in timed coincidence with the reception of each radar pulse, and, since the reception of such pulses by antenna 12 occurs essentially simultaneously with the reflection of such pulses from the body of the vehicle on which the system of FIG. 1 is carried, the jamming signal is in effect cut off during each time period when a pulse is being reflected back to the radar.

Figure 2:
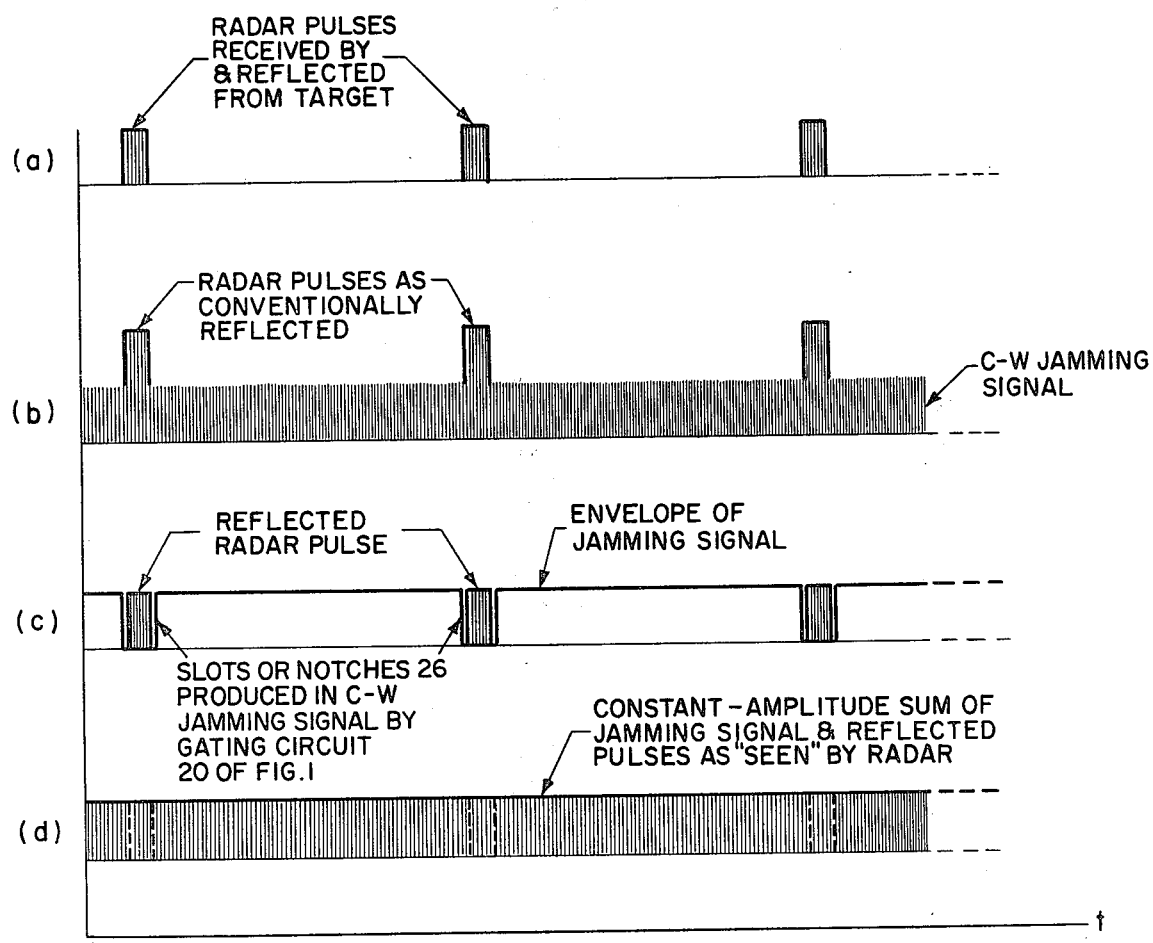
FIGS. 2(a) through 2(d) is a set of waveforms useful in understanding the operation of the system of FIG. 1.

FIG. 2 of the drawings illustrates the relationship between the generated jamming signal, on one hand, and the received and reflected radar pulses, on the other. In the absence of apparatus embodying the present concept, the radar pulses of waveform (a) in effect are superimposed upon the generated jamming signal, as shown in waveform (b). They are then easily detected by the radar by clipping and/or limiting networks. However, if the jamming signal is periodically interrupted by closing of gate 20 (FIG. 1) then slots or notches 26 are produced in the jamming signal as shown in waveform (c). Since these slots are produced concurrently with the reception and reflection of the radar pulses, the latter in effect "fall into" the slots as illustrated in waveform (c), and, inasmuch as the amplitude of the jamming energy produced by oscillator 18 may be selected in accordance with the "radar cross-section" of the vehicle being protected, the combined signals as set forth in waveform (d) may have an essentially constant amplitude as seen by the radar. Thus, an enemy radar is prevented from obtaining any knowledge on the jamming signal as to the range of the aircraft on which the invention apparatus is installed.

Obviously, the gating circuit of FIG. 1 must employ fast-acting components to minimize any delay in interrupting the CW signal from oscillator 18. In practice, a very narrow spike representing the leading edge of each radar pulse may appear in waveform (d) of FIG. 2, but since the energy in this spike is so small it is virtually undetectable by the radar and hence has been omitted from the drawing. Actually, it will closely resemble a noise impulse as viewed by the radar observer. Also in waveform (c) of FIG. 2, the spacing between the leading and trailing edges of the radar pulses and the corresponding sides of the slots 26 has been exaggerated in order to more clearly depict the manner in which the pulses "fall into" their respective slots.

In some cases, both the filter 14 and the video detector 16 can be omitted, and the received radar pulses employed directly to determine the operating frequency of the oscillator 18 and also to control the production of pulses by the generator 24. Whether or not such an expedient is possible depends largely upon both the amplitude of the radar pulses and upon their time duration.

It will now be recognized that the principles of the present invention are applicable to other types of countermeasures systems as long as the radar pulses received by the target are coherent, or, in other words, possess a constant repetition frequency.

Obviously many modifications and variations of the present invention are possible in the light of the above teachings. It is therefore to be understood that within the scope of the appended claims the invention may be practiced otherwise than as specifically described.

I claim:

1. In an electronic countermeasures system designed for installation on a vehicle to prevent such vehicle from being located by a radar of the pulse type, the combination of:

a receiver for intercepting pulses transmitted by said radar;

means for deriving from the pulses so intercepted a signal indicative of the radar's operating frequency;

a CW oscillator;

means for applying the signal so derived to said oscillator to cause the operating frequency thereof to essentially coincide with the operating frequency of the radar;

means for transmitting the CW output of said oscillator;

a normally-open gate through which the output of said oscillator is applied to said transmitting means;

a pulse generator;

means for applying the output of said receiver to said pulse generator to cause a pulse to be generated in time coincidence with each intercepted radar pulse; and means for applying the output of said pulse generator to said gate to cause the latter to close during the time period of each intercepted radar pulse and thus interrupt the transmission of CW energy during each such time period.

2. The combination of claim 1 in which said means for applying the output of said receiver to said pulse generator to cause a pulse to be generated in time coincidence with each intercepted radar pulse includes a video detector for deriving from the output of said receiver a signal indicative of the radar pulse repetition frequency.

3. The method of preventing a vehicle from being located by a radar of the pulse type as a result of pulses from said radar being reflected from said vehicle, said method comprising:

transmitting from said vehicle a CW signal at the operating frequency of the radar; and interrupting the transmission of such CW signal from said vehicle coextensively with each time period that a radar pulse is received by said vehicle.

4. The method of claim 3 wherein the amplitude of the transmitted CW signal is approximately equal to the amplitude of the reflected radar pulse.

* * * * *